United States Patent Office 3,635,943
Patented Jan. 18, 1972

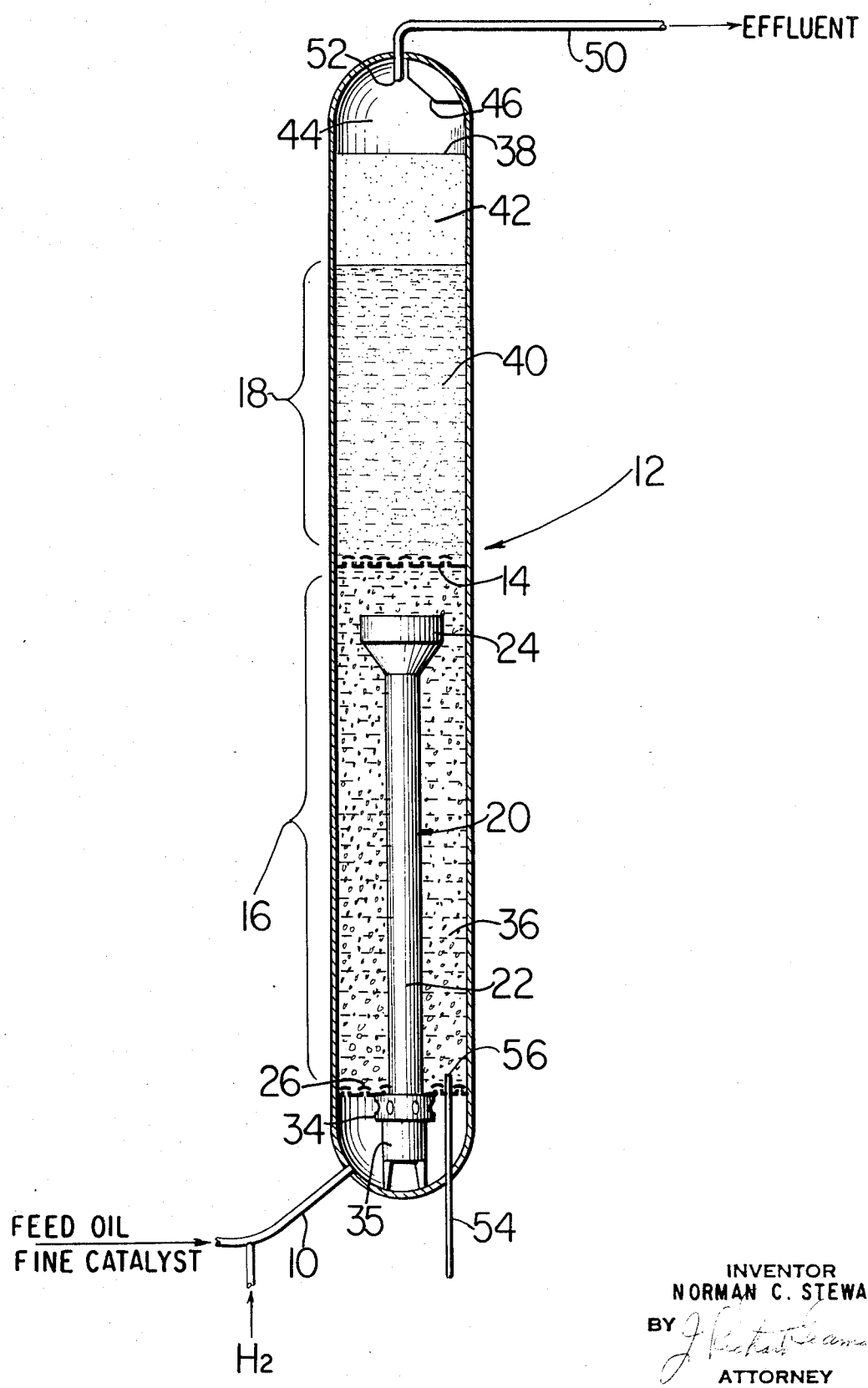

1

3,635,943
HYDROTREATING PROCESS WITH COARSE
AND FINE CATALYSTS
Norman C. Stewart, Lake Charles, La., assignor to Cities
 Service Research and Development Company, New
 York, N.Y.
Filed Oct. 16, 1969, Ser. No. 866,874
Int. Cl. C10g 13/02, 23/00
U.S. Cl. 208—157  7 Claims

ABSTRACT OF THE DISCLOSURE

A process for treating heavy hydrocarbon oil with hydrogen gas at high pressures and temperatures in the presence of particulate catalysts is disclosed herein. The process comprises feeding the heavy hydrocarbon oil, preferably a vacuum or atmospheric residuum, hydrogen gas and fine particulate catalyst in the size range of up to about 600 microns upwardly through an expanded bed of coarse particulate catalyst ranging in size from about 1/33 to about 3/8 inch at a sufficient velocity to maintain the bed in an expanded, random motion state, reducing the upward velocity of the hydrocarbon oil, hydrogen gas and fine particulate catalyst above the expanded coarse catalyst bed to a velocity sufficient to establish an expanded fine catalyst bed, and withdrawing the treated hydrocarbon oil and effluent gases from the high pressure, high temperature zone above the fine catalyst bed.

BACKGROUND OF THE INVENTION

This invention relates to a process for hydrotreating hydrocarbon oil, at high pressures and high temperatures in an up-flow reactor system. More particularly, this invention relates to a process for the efficient and effective utilization of particulate catalysts in a multi-stage high pressure, high temperature process and has particular application in the hydrogenation, hydrocracking, hydrodesulfurization and denitrogenation of relatively heavy hydrocarbon oils in order to product hydrocarbon products in lower boiling ranges.

Heavy hydrocarbon material such as residuum, naturally occurring tars and shale oil, coke and gas oil and other high-boiling hydrocarbon oils generally require further treatment in order to obtain commercially useful lighter hydrocarbon distillates. Such heavy hydrocarbon oils are generally unsatisfactory for further conventional refinery treatment since they possess a large degree of unsaturation and also have high nitrogen and sulfur contents. Hydrocracking processes for the conversion of heavy hydrocarbon oils to light and intermediate naphthas of good quality for use in reforming feedstocks, and for nitrogen and sulfur removal are generally well known. Such processes are commonly carried out using a fixed bed catalyst process with hydrocarbon oil and hydrogen passing as a down-flow stream through the catalyst bed. Hydrogen consumption in such processes is very high with a considerable amount of heat being produced due to the exothermic nature of the reaction. This results in considerable temperature rise across the catalyst bed and increased carbon deposition on the catalyst.

In order to limit the amount of heat released during the process, the degree of cracking is limited to some extent by the material recycled for further processing. Such recycling is expensive, cumbercome, and results in low space velocities based on fresh feed, partly because of the excessive high-reactive volume occupied by the recycle liquid and the already converted material. A process which has been developed for successfully overcoming these problems utilizes an up-flow type high pressure, high temperature reactor in which the catalyst bed is subjected to a high liquid throughput in order to greatly expand the bed and to induce random motion of the particulate catalyst in the bed. This type of catalyst bed is generally referred to as an ebullated bed. Such a hydrocracking process is shown for instance in U.S. Pat. No. 3,207,688 issued to Roger P. van Driesen on Sept. 21, 1965 for a two-stage hydrocracking process.

Such a system utilizes a single type of particular catalyst in each reactor and as a result there are limitations inherent in the use of each reactor. The system shown obtains flexibility by utilizing two different reactors so that both the catalyst and the operating conditions may be varied without effecting the conditions in the other reactor. As an added factor catalysts cannot be readily regenerated, both due to the nature of the catalyst and to the reaction in which it is used. This one time use of the catalyst imposes an economic burden upon the system since the catalyst is costly as well as some loss of flexibility due to the specific characteristics of the catalyst. My invention obviates certain of these factors by utilizing the controlled presence of two differently sized catalyst particles in a single reactor.

SUMMARY OF THE INVENTION

Accordingly, I have invented a process for treating hydrocarbon oils with hydrogen gas in a high pressure, high temperature reactor. The process comprising feeding the oil, hydrogen gas, and fine particulate catalyst, upwardly through an expanded bed of coarse particulate catalyst in the lower portion of the reactor at sufficient velocity to maintain the bed in an expanded state, reducing the upward velocity of the oil, hydrogen gas and fine catalyst at a point above the lower bed to a velocity sufficient to establish a bed of fine catalyst in an expanded state in the upper portion of the reactor. Treated oil, and effluent gases are withdrawn from the reactor as product. Preferably the fine particulate catalyst is produced from spent catalyst. Spent coarse catalyst from the coarse catalyst bed is regenerated by controlled combustion followed by reduction to a fine powdery size of from 100 microns to about 600 microns, and preferably from 300 to 600 microns.

It is therefore an object of this invention to provide a process for the efficient hydrotreating of a heavy hydrocarbon oil.

Another object of this invention is to provide a process which more efficiently employs particulate hydrotreating catalyst.

Other objects and advantages of the process of this invention will become apparent to those skilled in the art from the brief description of the drawings and preferred embodiment which follow.

DESCRIPTION OF THE DRAWING

The drawing shows in schematic form a reactor system operating according to the process of this invention.

DESCRIPTION OF THE PREFERRED EMBODIMENTS

The present invention provides a unique method for treating oils in a simple reactor. By employing two differently sized particulate catalysts, two generally separate expanded catalyst beds are established in the single reactor. Basically, the process contemplates feeding regenerated fine catalyst together with the hydrocarbon oil feed and a hydrogen containing gas into a hydrotreating vessel, and passing the mixture upwardly through an expanded coarse catalyst bed in the reactor. Above the level of the coarse catalyst bed the fine catalyst, hydrocarbon reactant and gaseous mixture, passing upwardly into the upper portion of the reactor establishes an expanded fine catalyst bed. A portion of the hydrocarbon reactant liquid is recycled back to the bottom of the reactor. Recycling effectively adds to the flow of fluids through the lower catalyst bed and the resultant velocity is sufficient to maintain the lower bed in an expanded state. The upward flow above the lower catalyst bed is reduced to a velocity which enables fine particulate catalyst to concentrate and form a fine catalyst bed in the upper portion of the reactor. Effluent is withdrawn from the reactor above the level of the fine catalyst bed.

The particulate coarse and fine catalysts may be of any suitable catalyst composition. Suitable catalyst compositions include a large number of material such as cobalt, molybdenum, iron, nickel, tungsten, platinum, palladium, naturally occurring clays, as well as combinations of the same. Such catalysts may be used either alone, or more preferably supported on suitable bases such as alumina, silica, zirconium, and combinations thereof. For the particular application described herein, a cobalt-molybdenum catalyst supported on alumina is the preferred composition.

The coarse particulate catalyst is in the form of either pellets or extrudates in the size range of from 1/32 inch to about 3/8 inch in diameter. After becoming inactivated the coarse catalyst may be regenerated by calcining in an air or oxygen atmosphere, and then is either attrited or more preferably pulverized to a size below 600 microns, preferably in the size range of from 300 to 600 microns for use as fine catalyst in practicing the invention.

The feed may be any suitable hydrocarbon liquid for which a desired treatment is hydrogenation. For this reason naphtha and other oils boiling below 450° F. are not regarded as suitable. Preferably the feed is a liquid hydrocarbon boiling above 450° F., and more preferably above 650° F. Heavy hydrocarbon oils boiling above 950° F. such as vacuum or atmospheric residuums are preferred feeds for practicing the method of this invention, being particularly suitable for refining by hydrotreating. The term hydrotreating is intended to cover various reactions such as hydrocracking, hydrogenation, hydrodesulfurization and hydrodenitrogenation, all of which are obtainable in varying degrees by utilizing the process described herein.

With reference to the drawing, a heavy hydrocarbon oil feed, a hydrogen containing gas in the amount of from 1000 and 15,000 standard cubic feet per barrel of fresh feed (s.c.f./b.), and regenerated fine particulate catalyst in the amount of from 0.002 to 0.10 lb. catalyst/ft.$^3$ of feed is fed via feed pipe 10 into the bottom of a reactor vessel 12.

The reactor vessel 12 is a vertically mounted cylindrically shaped vessel with hemispherical ends capable of withstanding extremely high pressures and temperature, respectively, on the order of at least 2000 p.s.i. and 850° F. The vessel has a horizontal upper grid 14 fixedly mounted approximately midway in the cylinder. The upper grid 14 effectively divides the vessel into two stages, a lower portion 16 and an upper portion 18. It should be understood that a grid is not absolutely required, any device or arrangement for restricting or throttling fluid flow between the vessel's upper and lower portion being sufficient such as an annular ring.

Mounted in the lower portion 16 of the reactor vessel is a recycle conduit 20. The recycle conduit 20. The recycle conduit is a vertically mounted conduit having a tube shaped lower end 22 and a funnel shaped upper end 24. Just above the lower end of the recycle conduit is a horizontally mounted lower grid 26. The upper and lower grids 14 and 26 can be any conventional grids used in refinery processing which act to prevent substantial liquid backflow such as bubble cap trays, etc.

A space is provided between the top of the recycle conduit and the bottom side of the upper grid to act as a disengagement space for coarse catalyst and fine catalyst. A portion of the fluids are recycled via the recycle conduit to the bottom of the vessel. This acts to sufficiently reduce the upward linear fluid velocities in the vessel in the space above the recycle conduit, to a velocity which would be required to carry the fine particulate catalyst upwards with the fluid reactants. In other words by recycling up to 90% of the fluids from above the coarse catalyst bed to the bottom of the reactor a fluid velocity is established in the area of coarse catalyst bed which is sufficient to expand the volume of the coarse catalyst bed, and to carry the fluids including the fine particulate catalyst into the upper portion of the reactor vessel. Above the recycle conduit upper end, the superficial upward velocity of the fluids is reduced as a result of the recycling of a portion of the fluids back to the bottom of the vessel, and the throttling effect of the upper grid 14. The reduced superficial upward velocity is low enough to allow the fine particulate catalyst to form a catalyst bed above the upper grid 14 in the vessel upper portion 18.

Mounted at the lower end of the recycle conduit is a pump 34. The pump 34 draws fluid down the recycle conduit and pumps the fluid into the bottom of the vessel below the lower grid thereby providing a substantial upward flow in the lower portion of the vessel. The pump 34 is driven by suitable means such as an internally mounted hydraulic motor 35. The superficial upward fluid velocity in the lower portion of the reactor is maintained at between 0.05 and 0.5 foot per second with a velocity of 0.1 foot per second being preferred. This acts to establish a coarse catalyst bed 36 occupying up to five times its quiescent volume. A diffuse upper catalyst bed boundary 38 is formed in the vessel considerably above the recycle conduit funnel top. The concentration of fine catalyst in the lower portion of the vessel below the upper grid is maintained at a minimum of about 0.2 pound catalyst per cubic foot (lbs. per ft.$^3$) of feed volume with a fine catalyst concentration of about 2.5 lbs. per ft.$^3$ being preferred. The concentration of coarse catalyst in the coarse catalyst bed is on the order of from 20 lbs. to 60 lbs. of coarse catalyst per cubic foot of bed volume. A preferred range of coarse catalyst bed density is from 30 to 40 lbs. per ft.$^3$ of bed volume, with 35 lbs. per ft.$^3$ being particularly preferred.

Recycling a portion of the liquids to the bottom of the vessel via the recycle conduit and the throttling effect of the upper grid lowers the superficial velocity of fluid in the upper portion of the vessel to a velocity of from about 1/5 to about 1/20 of the superficial velocity through the coarse catalyst bed and causes the fine catalyst above the upper grid to concentrate into a relatively dense fine catalyst bed 40. Preferably an upward velocity of from 0.01 to 0.125 feet per second is established through the fine catalyst bed. A relatively diffuse upper boundary layer 42 of progressively more dilute fine catalyst concentration is established for the fine catalyst bed 40. For purposes of this invention the dense portion of the fine catalyst bed 40 has a concentration of from 20 lbs. to 60 lbs. of fine catalyst per cubic foot of bed and a preferred concentration of from 25 lbs. to 35 lbs. of fine catalyst per ft.$^3$ of bed. The diffused boundary layer 42 has a density gradient of from 60 pounds per cubic foot to 0.2 pound per cubic foot of volume, and a preferred gradient of from 30 lbs. to 2.5 lbs. per ft.$^3$.

Above the upper limit of the fine catalyst bed upper boundary 38, a vapor space 44 is provided for disengaging a substantial portion of the fine particulate catalyst from the effluent. A demister 46 to minimize entrainment of liquid is mounted above the vapor space 44 by suitable attachments. The demister 46 is any conventional device for accomplishing this function such as a wire mesh screen or baffles for reducing upward velocity of the vapor by changing its direction so as to reduce entrained liquids.

An effluent withdrawal conduit 50 is connected to the top of the reactor vessel 12 and has an opening 52 within the top hemispherical end of the vessel. The withdrawal conduit 50 extends through the vessel wall to further apparatus not shown for processing the effluent such as vapor-liquid separators, heat exchangers, fractionators, storage tanks, etc.

Mounted within the lower portion of the vessel is a liquid and coarse catalyst withdrawal pipe 54. The liquid withdrawal pipe 54 has an opening 56 located in the lower part of the coarse catalyst bed 36. The pipe 54 extends downwardly through the lower grid and the lower end of the reactor to a catalyst dumping pot, not shown, where withdrawn liquid and solids are separated. The coarse catalyst is subsequently calcined to burn off the coke or carbonaceous material deposited thereon, ground up to a powder having a size range of from 100 to 600 microns, and more preferably 300 to 600 microns and returned to the process for introduction into the reactor as fine catalyst. The liquid and catalyst withdrawal pipe 54 may be utilized to withdraw liquid product as desired from the reactor vessel, or a separate liquid withdrawal pipe, not shown, may be communicatingly connected to the interior of the vessel at a point above the coarse catalyst bed upper level to permit the withdrawal of liquids from the vessel.

With a view to more clearly illustrating the process of this invention the following example is given.

A vertically mounted high pressure reactor vessel having an inside diameter of 4.5 feet and an overall length of 38 feet, not inclusive of hemispherically shaped end caps, is utilized to practice the process of this invention. The lower grid is located 3¾ feet above the bottom of the vessel, with a vertically mounted recycle conduit extending therethrough upwardly for a distance of 19.5 feet. A pump is attached to the bottom end of the recycle conduit. The upper end of the recycle conduit is a funnel shaped opening about 2¼ feet in diameter. Two feet above the top of the recycle conduit an annular ring is transversely mounted with an opening equal to one half the vessel internal diameter. A demister is mounted at the top of the vessel just below the effluent withdrawal conduit opening. In operation, a coarse catalyst bed composed of molybdenum and cobalt on an alumina support and sized in the range of from $\frac{1}{32}$ inch to $\frac{3}{8}$ inch is established in the lower portion of the vessel below the funnel shaped opening of the recycle conduit. The amount of coarse catalyst is such as to establish an expanded catalyst bed having a concentration of 34.6 pounds per cubic foot for a height of 12.5 feet over the lower grid, that is, about 6875 pounds of catalyst.

2500 barrels per standard day b.p.d. of a vacuum residuum feedstock exhibiting an API number of 10° and containing 75% of material boiling above 950° F., together with 5000 standard cubic feet of hydrogen per barrel and about 800 pounds per barrel of feed of fine catalyst particles in the size range of from 300 to 400 microns is fed into the vessel. A superficial liquid velocity of about 0.1 feet per second in the lower stage of the reactor is maintained by recycling 90% of the fluids down through the recycle conduit to the bottom of the vessel. Superficial liquid velocity above the annular ring is therefore reduced about 10 times by the reduction in upward flowing liquids and the throttling effect of the annular ring. Accordingly, the superficial upward velocity above the annular ring is maintained at about 0.01 feet per second causing the fine catalyst entrained by the liquid to form a relatively dense fine catalyst bed about 10 feet high above the ring. The dense fine catalyst bed is characterized by a catalyst concentration of 29 pounds per cubic foot. A boundary layer one half foot high is established above the fine catalyst bed, with the upper part of the boundary layer having a 2.5 pounds per cubic foot concentration of fine catalyst. A vapor space two feet high is provided between the top of the boundary layer and a baffle demister for vapor-liquid disengagement. Effluent is removed via a withdrawal conduit opening in the top of the vessel. Effective conversion of the residuum feedstock is about 60%, yielding 40% of heavy gas oil boiling in the 650–950 F. range, 25% of gas oil boiling in the 450° F. to 650° F. range and 15% of naphtha boiling in the 200° F. to 400° F. range.

Having fully described the process and apparatus of this invention and wishing to cover those modifications and variations as would be apparent to those skilled in the art without departing from both the spirit and scope of the invention.

I claim:
1. A process for treating heavy hydrocarbon oil with hydrogen gas in the presence of particulate catalyst, said process comprising:
   feeding said heavy hydrocarbon oil, hydrogen gas, and fine particulate catalyst upwardly through an expanded bed of coarse particulate catalyst in a first high temperature, high pressure zone at sufficient velocity to maintain said coarse catalyst bed in an expanded state;
   recycling a portion of said hydrocarbon oil from above said expanded coarse catalyst bed in said first zone to below said coarse catalyst bed and mixing said recycled oil with said feed thereby providing sufficient upward velocity to maintain said coarse catalyst bed in an expanded state;
   reducing the upward velocity of said hydrocarbon oil, hydrogen gas, and fine particulate catalyst in a second zone above said expanded coarse catalyst bed to a flow velocity sufficient to establish an expanded fine particulate catalyst bed by interposing a flow constriction between said first and said second zone, said flow constriction and said recycling of a portion of said oil acting to reduce the upward velocity in said second zone; and
   withdrawing treated hydrocarbon oil and effluent from said high pressure, high temperature zone.
2. The process of claim 1 wherein said coarse particulate catalyst comprises particles having a cross-sectional size of from about $\frac{1}{32}$ inch to about $\frac{3}{8}$ inch, and wherein said fine particulate catalyst comprises particles of from about 100 microns to about 600 microns in size.
3. The process of claim 2 wherein said expanded coarse catalyst bed has a coarse particulate catalyst concentration of from about 30 lbs. to about 40 lbs. per cubic foot of bed volume.
4. The process of claim 3 wherein said fine catalyst bed has a fine particulate catalyst concentration of from about 25 lbs. to about 35 lbs. per cubic foot of fine catalyst bed volume.
5. The process of claim 4 wherein the step of reducing the upward flow velocity of the hydrocarbon oil, hydrocarbon gas, and fine particulate catalyst in said second zone comprises lowering said flow velocity by introposing a flow restriction having a crosss-ectional area between said coarse and fine catalyst beds of between 10% and 25% of said coarse and fine catalyst bed cross-sectional areas.
6. The process of claim 4 wherein the upward liquid velocity of liquids through the coarse catalyst bed in said first zone is from about 0.05 ft. per sec. to about 0.5 ft. per sec., and wherein the upward liquid velocity of liquid through the fine catlayst bed in said second zone is from 0.01 ft. per sec. to about 0.125 ft. per sec.
7. The process of claim 4 wherein said step of recycling said hydrocarbon oil from above to below said coarse catalyst bed comprises recycling said oil in the amount of up to nine times the amount of said heavy hydrocarbon oil feed.

References Cited

UNITED STATES PATENTS

| | | | |
|---|---|---|---|
| 2,662,091 | 12/1953 | Odell | 208—157 X |
| 3,183,178 | 5/1965 | Wolk | 208—58 |
| 3,151,060 | 9/1964 | Garbo | 208—213 |
| 3,207,688 | 9/1965 | Van Driesen. | |
| 3,207,689 | 9/1965 | Van Driesen | 208—152 |
| 2,987,468 | 6/1961 | Chervenak | 208—108 |
| 3,539,499 | 11/1970 | Chervenak et al. | 208—157 |

DELBERT E. GANTZ, Primary Examiner

G. E. SCHMITKONS, Assistant Examiner

U.S. Cl. X.R.

23—288 S; 208—112, 143, 163